Patented Oct. 27, 1925.

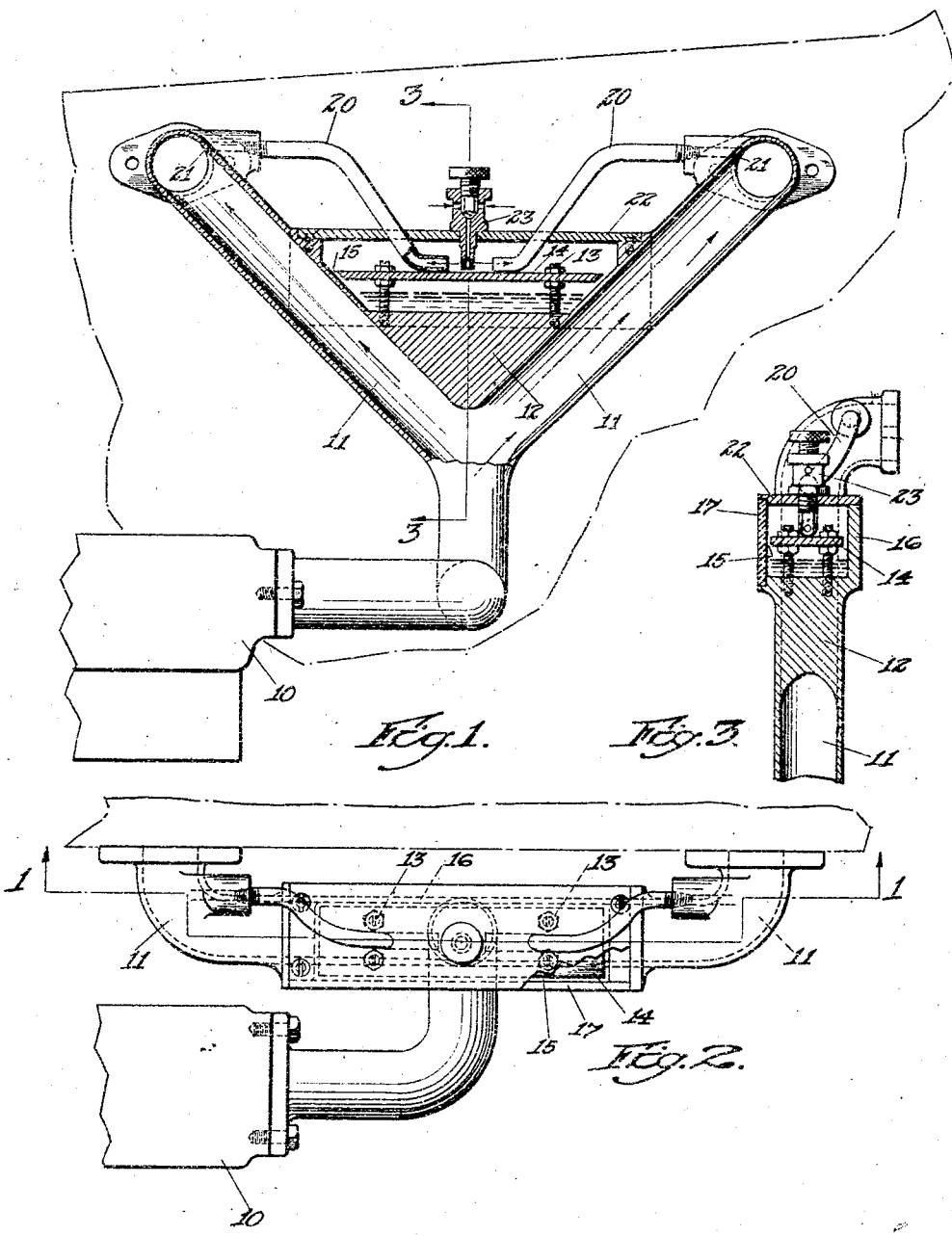

1,559,445

UNITED STATES PATENT OFFICE.

HENRY W. LAVIGNE, OF WORCESTER, MASSACHUSETTS, ASSIGNOR OF ONE-HALF TO ASSAF G. ABYSALH, OF WORCESTER, MASSACHUSETTS.

INTERNAL-COMBUSTION ENGINE.

Application filed February 6, 1925. Serial No. 7,405.

*To all whom it may concern:*

Be it known that I, HENRY W. LAVIGNE, a citizen of the United States, residing at Worcester, in the county of Worcester and State of Massachusetts, have invented a new and useful Internal-Combustion Engine, of which the following is a specification.

This invention relates to the introduction of moisture into the intake of an internal combustion engine.

The principal objects of the invention are to provide a device which can be applied with slight modifications to any form of engine when it is manufactured and which can even be applied to several kinds after they are made and which will effectively provide for the introduction of moisture and air into the intake with the current of combustible mixture so as to secure improved running conditions.

Reference is to be had to the accompanying drawings, in which

Fig. 1 is a sectional view on the vertical line 1—1 of Fig. 2, showing the intake of an internal combustion engine, with a preferred embodiment of my invention applied thereto;

Fig. 2 is a plan of the same; and

Fig. 3 is a sectional view on the line 3—3 of Fig. 1.

I have shown the invention as applied to an intake manifold of ordinary type in which the combustible mixture is taken to the engine from a carburetor 10 through a pair of diverging passages 11 which lead to the engine. I utilize the space between these two parts of the intake manifold for providing for the introduction of moisture to secure the well known improvement in the running of the engine which is noticed at night on account of the additional moisture in the air at that time.

At a convenient point on the casting 12, in which the passages 11 are formed, I bore holes and thread them for the reception of screws 13. These screws support a plate 14 which is held in place by nuts as will be understood readily. This plate 14 is of just such size as to provide a space 15 around it and between its edges and the adjacent surfaces or walls of the receptacle which is formed around it partly by the walls of the tube and partly by a rear wall 16 of metal and a front wall 17 of glass preferably. These walls are secured in position in any desired way. If the device is manufactured in the shop in which the engine is made, the wall 16 is cast as an integral part, but in any event the glass wall 17 is set into recesses and cemented in so that it is firmly held in place and forms a water and airtight seal.

Just above the top of the plate 14 I provide a pair of moist air tubes 20, each having a horizontal inlet end and each extending up into the intake at 21. These tubes are without valves or obstructions and are smaller than the tubes 11 so that suction will be produced through them without materially interfering with the taking up of the combustible mixture by the engine.

The space below the plate 14 is intended to be filled with water, the level of which can be observed through the glass 17 and as the casing formed as above described is covered by a removable cover 22, this space contains more moisture than the outer air. The heat which the engine develops necessarily adds to the humidity of the air in this space. Therefore the moisture will be taken up into the engine and mixed with the gases before combustion.

The plate 22 can be removed for the purpose of introducing the water or for putting in the screws 13 or taking them out. It is provided with an air valve 23 which can be adjusted as is well understood and has openings for the admission of air from the outside so that in the ordinary running no vacuum need be created in the casing.

This furnishes a means for supplying moisture to the engine with the gas and air that are ordinarily supplied and without reducing the quantity of the same and permits of the engine running under moisture conditions similar to those that ordinarily exist at night. It involves comparatively little change in the construction of the engine and that entirely outside where it is accessible and the condition of the water inside can be observed at all times.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described but what I do claim is:

1. The combination with an internal combustion engine having a pair of passages, of a water receptacle formed between the passages and supported by their walls, the front wall of said receptacle comprising a glass plate through which the level of the water can be observed, tubes extending from the top of said receptacle into the intakes of the engine for conducting into the engine with the combustible mixture, moisture formed in the top of the receptacle, and adjustable means for admitting air into the receptacle.

2. The combination with an internal combustion engine having an intake manifold of a Y-form with an air-tight receptacle formed in the space between the two branches thereof for receiving water, a horizontal plate in said receptacle located above the level of the water and held in such position as to permit the passage of moisture upwardly around it when the water is heated, and a pair of conduits leading from above the top of said plate into the intake of the engine to conduct moisture into the mixed gases.

In testimony whereof I have hereunto affixed my signature.

HENRY W. LAVIGNE.